US008052359B2

(12) United States Patent  
Wirth, Jr. et al.

(10) Patent No.: US 8,052,359 B2
(45) Date of Patent: Nov. 8, 2011

(54) COUNTERSINK ASSEMBLY

(75) Inventors: John Wirth, Jr., Dubois, WY (US); Jay L. Sanger, Casper, WY (US); Paul Brutsman, Casper, WY (US); Mark K. McCool, Casper, WY (US)

(73) Assignee: Woodworker's Supply, Inc., Casper, WY (US)

( * ) Notice: Subject to any disclaimer, the term of this patent is extended or adjusted under 35 U.S.C. 154(b) by 324 days.

(21) Appl. No.: 12/318,641

(22) Filed: Jan. 5, 2009

(65) Prior Publication Data

US 2010/0172706 A1    Jul. 8, 2010

(51) Int. Cl.
    B23B 51/10    (2006.01)
(52) U.S. Cl. .......................... 408/191; 408/202; 408/225
(58) Field of Classification Search .................. 408/110, 408/113, 202, 227, 230, 191, 223–225, 189, 408/192, 193, 197
    See application file for complete search history.

(56) References Cited

U.S. PATENT DOCUMENTS

| | | | | |
|---|---|---|---|---|
| 332,308 A * | 12/1885 | Valentine | ...................... | 408/224 |
| 1,105,154 A * | 7/1914 | McMillen | ...................... | 408/202 |
| 2,344,143 A * | 3/1944 | Harding | ........................ | 408/192 |
| 2,390,744 A * | 12/1945 | Smith | ........................... | 408/202 |
| 2,429,375 A * | 10/1947 | Smith | ........................... | 279/102 |
| 2,794,353 A * | 6/1957 | Bashlow et al. | .............. | 408/113 |
| 3,552,503 A * | 1/1971 | Lebar | ............................... | 175/40 |
| 4,039,266 A * | 8/1977 | O'Connell | .................... | 408/202 |
| 5,182,973 A * | 2/1993 | Martindell | ...................... | 81/429 |
| 5,795,110 A | 8/1998 | Wirth, Jr. et al. | | |
| 5,882,151 A | 3/1999 | Wirth, Jr. et al. | | |
| 6,273,652 B1 | 8/2001 | Wirth, Jr. et al. | | |
| 6,471,450 B1 * | 10/2002 | Mercier | ........................ | 408/1 R |
| 6,585,459 B2 | 7/2003 | Wirth, Jr. et al. | | |
| 7,147,409 B2 | 12/2006 | Wienhold | | |
| 7,258,513 B2 | 8/2007 | Gertner | | |
| 7,513,722 B2 * | 4/2009 | Greenberg et al. | ........... | 408/202 |
| 7,607,871 B1 * | 10/2009 | Nelson | .......................... | 408/113 |
| 2008/0056836 A1 * | 3/2008 | Shiao | ............................ | 408/191 |

FOREIGN PATENT DOCUMENTS

| | | | |
|---|---|---|---|
| JP | 06246525 A | * | 9/1994 |
| JP | 2000198010 A | * | 7/2000 |
| JP | 2005193352 A | * | 7/2005 |
| JP | 2005288629 A | * | 10/2005 |

* cited by examiner

Primary Examiner — Daniel Howell
(74) Attorney, Agent, or Firm — Nixon & Vanderhye PC

(57) ABSTRACT

A countersink assembly including a countersink sleeve body with a distal cutting edge, a longitudinal bore to receive and secured to a drill bit, and a flute extending from the distal cutting edge. A depth stop collar having a longitudinal bore is disposed on and secured to the countersink sleeve body. In an example embodiment, the longitudinal bore of the depth stop collar includes at least one passage for chip egress. In addition or in the alternative, the flute includes a flat surface and a part cylindrical surface extending from the distal cutting edge along the length of the flute at an angle to the longitudinal bore of the countersink sleeve body so as to present a slight down-cut spiral.

20 Claims, 5 Drawing Sheets

COUNTERSINK ASSEMBLY

BACKGROUND OF THE INVENTION

Drill countersinks are known in the art for receiving and holding a drill bit. An example prior art countersink is illustrated in FIG. 9. The countersink tool 10 includes a proximal end 12 with a shank 14 and a distal end 16 with a cutting edge 18. The shank 14 includes an annular groove 20 for connection with an automatic or "quick-release" coupling of a drill chuck to a holder (not shown). The shank 14 is of any suitable shape for rotatably engagement with a power source, using either a male or female coupling.

The countersink tool 10 includes a longitudinal bore 22 extending from the cutting edge 18. The bore 22 is adapted to receive a drill bit 24 therein having a diameter corresponding to that of the bore. The countersink tool 10 includes a body 27 having an outer wall 28 with a flute 26 formed at the distal end 16, which includes the cutting edge 18. The drill bit is held in place within the bore 22 by a set screw 30 which extends through the body 27 to engage the drill bit 24. Loosening the set screw 30, releases the drill bit 24 to adjust the length of the bit 24 extending from the distal end of the bore 22, and tightening the set screw 30 secures the drill bit within the bore 22 relative to body 27.

The illustrated countersink tool 10 is a single stage countersink with a single flute. Two stage countersinks are also known in the art for forming a counterbore having two diameters. Countersinks with more than one flute and/or set screws are also known in the art. Also illustrated is an adjustable stop collar 42 or depth stop attached to body 27 of the countersink tool 10. The depth stop 42 is placed upon the fluted portion of the countersink 10 to prevent an operator from drilling a counter bore too deep with the countersink tool 10. The conventional depth stop 42 is a simple ring having an inner diameter corresponding to the outer diameter of body 28. The depth stop collar 42 includes a workpiece engagement surface 43 and a set screw 44 to secure the collar in place along the length of the body 27 of the countersink tool 10. Loosening the set screw 44 releases the stop collar 42 to permit an operator to adjust its position along the length of the countersink tool 10 and tightening the set screw 44 secures the collar in place relative to the body 27. Thus, the depth of counter bore is adjustable in two ways, by adjusting the length of the drill bit extending from the bore 22 with the countersink set screw 30, and by adjusting the position of the stop collar 42 along the length of the countersink tool 10 with the depth stop collar set screw 44, thus fixing a counter bore depth D between the work engagement surface 43 of the stop collar 42 and the cutting edge 18 of the body 27 of the countersink tool 10.

BRIEF DESCRIPTION OF THE INVENTION

The invention may be embodied in a countersink assembly comprising: a countersink sleeve body with a distal cutting edge, a longitudinal bore through the sleeve to receive a drill bit, at least one flute extending from the distal cutting edge along at least a part of an outer surface thereof, and a mechanism for selectively securing the sleeve to a drill bit disposed in said longitudinal bore; and a depth stop collar having a longitudinal bore to receive and be slidable along the countersink sleeve body, and a mechanism for selectively securing the depth stop collar to said sleeve disposed therein, wherein at least one of the longitudinal bore of the depth stop collar and the flute is configured such as to allow chip egress at least one of 1) radially through the depth stop collar and/or 2) axially between the at least one flute and the depth stop collar toward a proximal end of the assembly.

The invention may also be embodied in a countersink assembly comprising: a countersink sleeve body with a distal cutting edge, a longitudinal bore through the sleeve to receive a drill bit, at least one flute extending from the distal cutting edge along at least a part of an outer surface thereof, and a mechanism for selectively securing the sleeve to a drill bit disposed in said longitudinal bore; and a depth stop collar having a longitudinal bore to receive and be slidable along the countersink sleeve body, and a mechanism for selectively securing the depth stop collar to said sleeve disposed therein, wherein each flute includes a flat surface and a part cylindrical surface extending from the distal cutting edge along the length of the flute at an angle to the longitudinal bore of the countersink sleeve body so as to present a slight down-cut spiral.

The invention may further be embodied in a depth stop collar comprising a cylindrical sleeve body having an annular end face and an aperture defined axially therethrough defining a longitudinal bore for selectively receiving a countersink sleeve body, said depth stop collar including at least one cutout for defining a radial opening that communicates the longitudinal bore thereof to a radial outside thereof so as to allow chip egress radially through a side of the depth stop collar.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
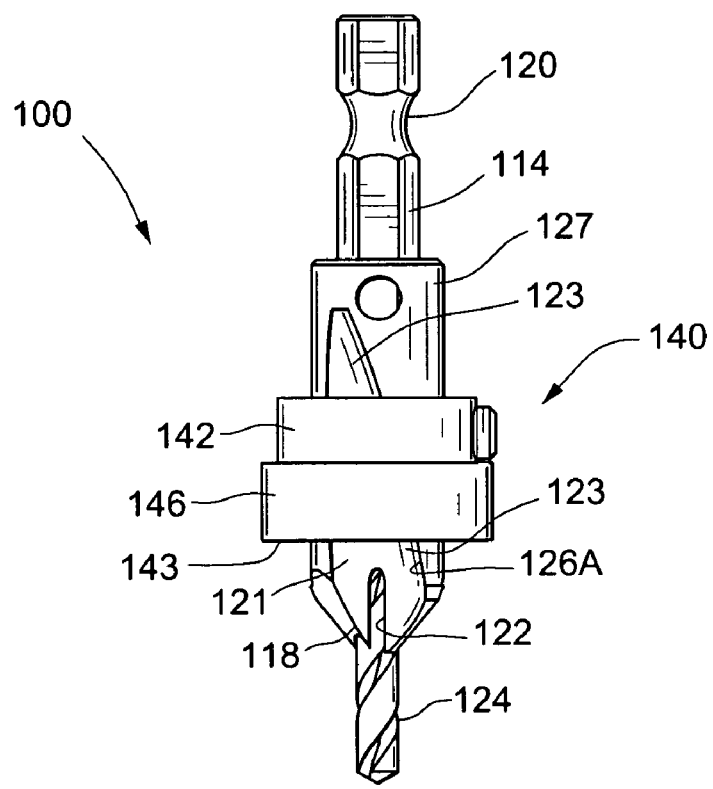
FIG. 1 is an elevational view of a countersink assembly providing according to an example embodiment of the invention.
Figure 2:
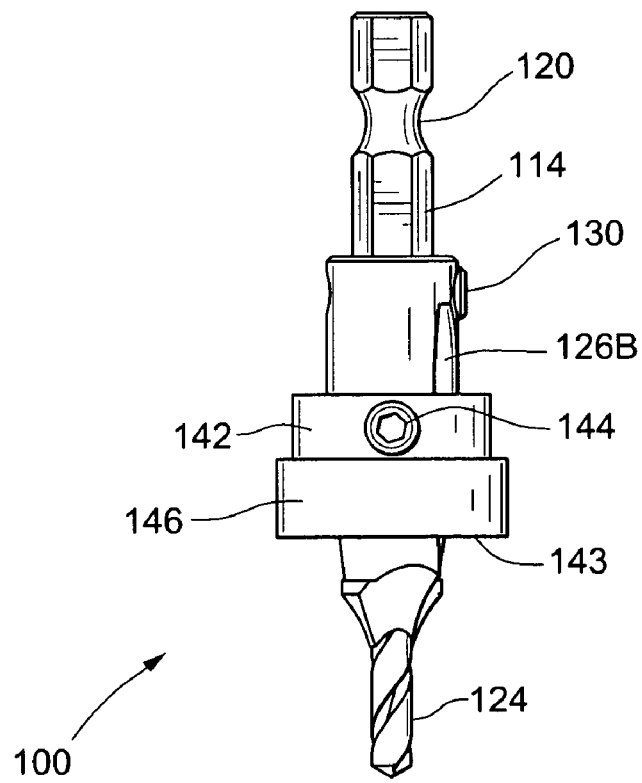
FIG. 2 is an elevational view of the assembly of FIG. 1 taken from the right of FIG. 1.
Figure 4:
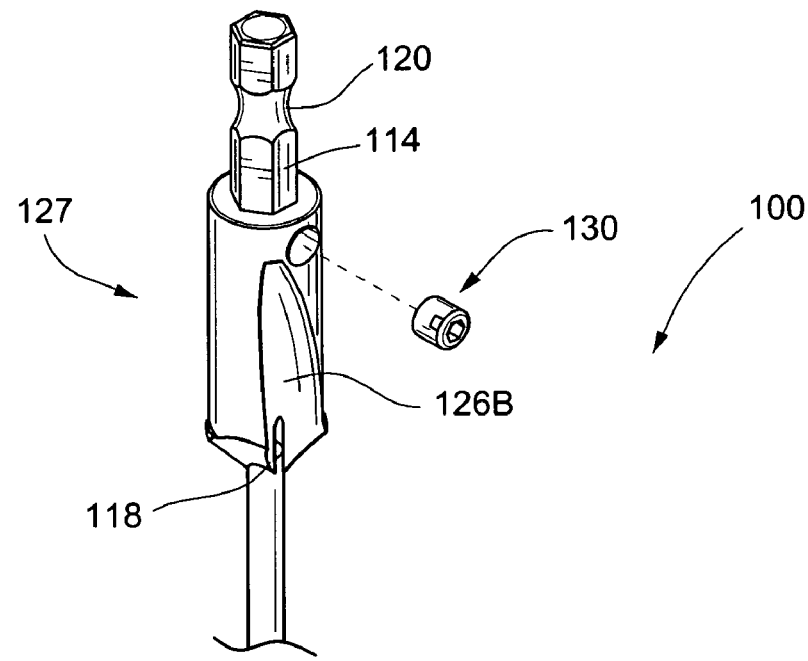
FIG. 4 is an exploded perspective view of the assembly of FIG. 1.
Figure 4:
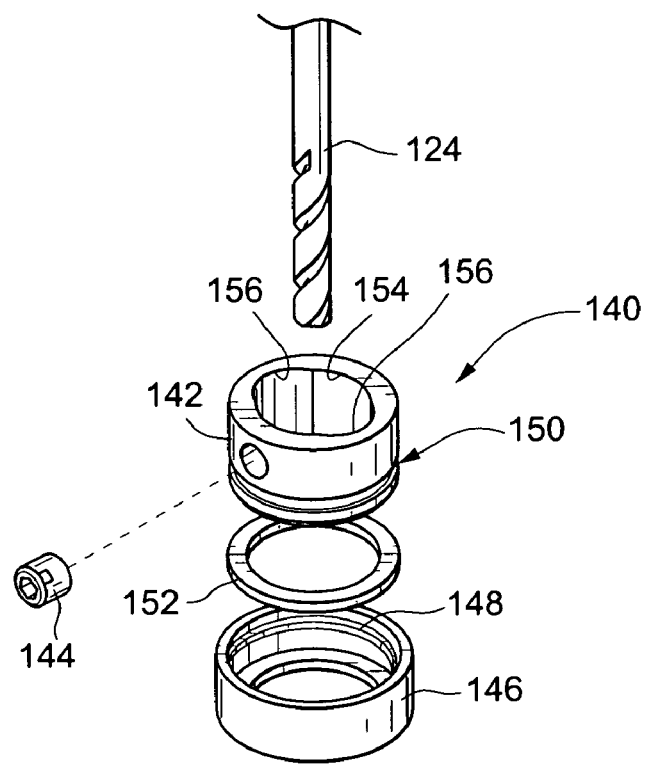

FIGS. 1 and 2 are side elevational views of one embodiment of a countersink assembly 100 which is comprised of, referring more specifically to the exploded view of FIG. 4, a countersink body 127 and a depth stop collar assembly 140. A first set screw 130 is disposed through a radial bore of the countersink for adjusting a length of the drill bit 124 extending from the countersink body 127. A second set screw 144 is provided for adjusting the position of the depth stop 140 along the length of the countersink. The adjustable depth stop collar is movable along the length of the countersink body 127 so that it can be secured in place at substantially any point along its length.

The countersink body 127 comprises a tubular sleeve which includes a longitudinal bore 122 extending from a cutting edge to a proximal end and is adapted to axially receive a drill bit. A flute 126A,126B is formed on an outer wall of the tubular sleeve to extend from the cutting edge 118 proximally. Consequently, a radial slot is formed along a portion of the drill bit. The flutes of the illustrated embodiment include a flat surface 121 and a part cylindrical surface 123 extending from the distal cutting edge 118 along the length thereof at an angle to the longitudinal bore 122 of the countersink sleeve body 127 so as to present a slight down-cut spiral. The down cut spiral advantageously results in a clean cut with no pull-out chipping. In the illustrated embodiment, two flutes 126A,126B are provided on the tubular sleeve, on diametrically opposite sides of the countersink body. In this example embodiment, the drill bit is an ordinary twist drill 124 bit commonly used in the art.

The depth stop collar assembly 140 provided in the illustrated example embodiment is a so-called no mar depth stop similar to that disclosed in our prior U.S. Pat. No. 5,795,110, the entire disclosure of which is incorporated herein by this reference. Thus, the depth stop includes a cylindrical body 142 having a bore extending axially therethrough. In the presently preferred example embodiment, the countersink is made of 416 series of stainless steel and heat treated, but could be composed of any material of suitable strength and hardness, such as brass, anodized aluminum, zinc plated low carbon steel and certain hard plastics.

The depth stop fits over the tubular sleeve 127 of the countersink body. The cylindrical body 142 is preferably secured with respect to the countersink body by means of a set screw 144 or the like extending radially through a threaded aperture formed in the cylindrical body. Although the depth stop is shown having only one set screw, it is contemplated that a depth stop according to the invention could include more than one set screw. In addition, the cylindrical body could be secured to the cutting tool by other means, such as, for example, a locking collet sleeve.

A cap 146 is fitted over one end of the cylindrical body. In the presently preferred example embodiment, the cap includes a radially inward extending circumferential flange 148 formed on the inner surface of the cap. The flange is seated within a circumferential groove 150 formed about the outer periphery of the cylindrical body 142 to mount the cap 146 to the body 142. The flange 148 preferably has a rounded edge and is seated within the groove 150 by press fitting the cap over then end face of the cylindrical body.

Alternatively, a flange could be formed on the outer periphery of the body and a groove could be formed on the inner periphery of the cap. The flange is preferably loose-fitting within the groove so that the cap is rotatable with respect to the body. Although the flange, whether provided on the cap or on the body, is preferably a continuous circumferential flange, a discontinuous flange structure could be adopted instead. The cap 146 is preferably composed of a polymer having a low coefficient of friction, preferably in the range of 0.04 to 0.10, such as nylon.

An annular ring 152 is most preferably provided between the end face 143 of the cylindrical body and the cap. The annular ring 152 is preferably a washer, also comprised of a polymer having a low coefficient of friction, for example in the range of 0.04 to 0.10, such as nylon, but may also comprise other friction reducing devices such as a needle thrust bearing. The annular ring facilitates rotation of the cap with respect to the body when the depth stop is pressed against a workpiece. Rotation is facilitated because the amount of friction between the annular ring and the cap is less than that between the annular ring and the body. The annular ring may bind when there is an axial force applied against the cap, but the cap will be less likely to bind under such an axial force. Best results are achieved if the flange has a non-interfering fit within the groove. Specifically, the groove and the flange should be sized and configured so that the flange does not contact the groove walls when the cap is under an axial thrust force from the workpiece. Thus, all axial bearing forces applied against the bottom surface of the cap will be received by the annular ring and end face of the body. If the flange bears against the sides of the groove, the cap might bind.

Figure 5:
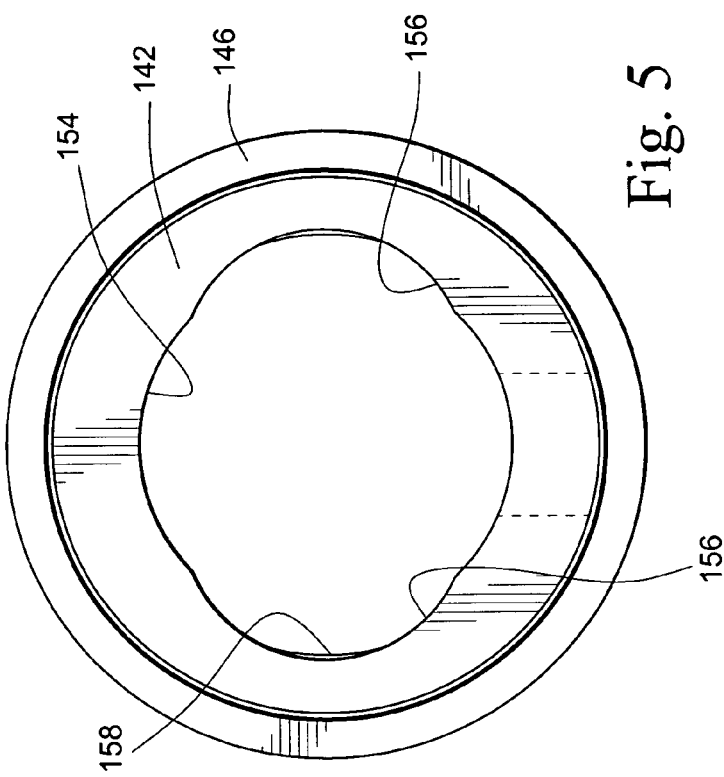
FIG. 5 is a plan view of the no mar depth stop provided in an example embodiment of the invention.
Figure 3:
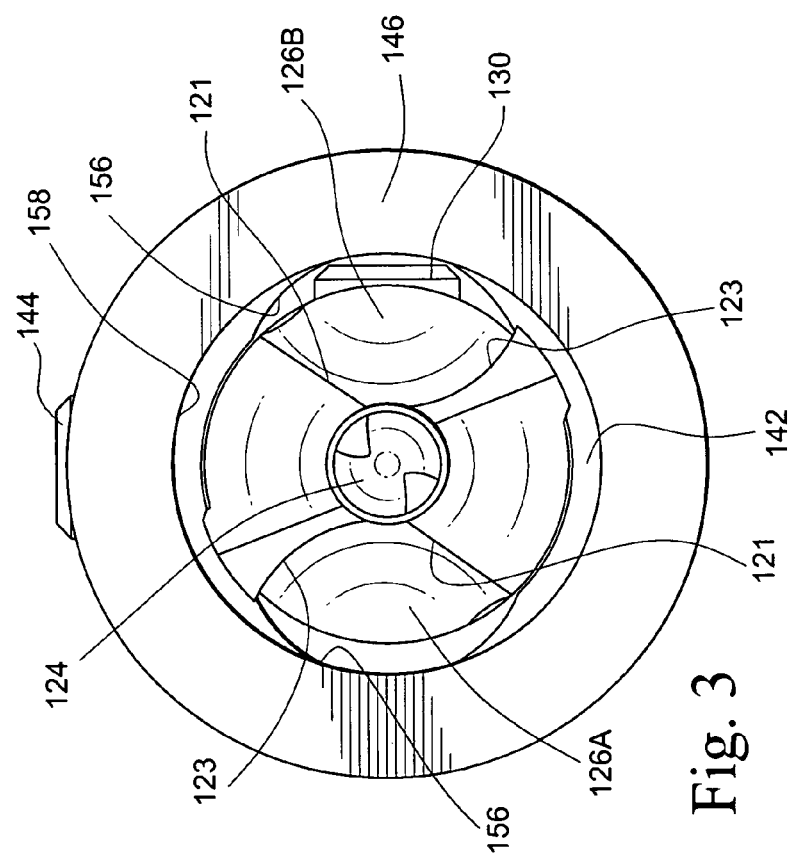
FIG. 3 is a bottom end view of the assembly of FIG. 1.

As illustrated in the bottom view of FIG. 3 and the top plan view of FIG. 5, the cylindrical body 142 provided according to the invention has a non-circular bore 154 defined therethrough. More specifically, at least one radial recess 156 is defined in the inner bore of the cylindrical body 142. When the depth stop assembly 140 is secured with respect to the countersink sleeve body 127, the at least one recess 156 is aligned with the respective flute 126A,126B of the countersink body. This facilities chip rout through the stop so that the countersink does not pack and require digging out chips. In the illustrated example embodiment, because the countersink body includes first and second flutes 126A,126B, first and second diametrically opposite radial recesses 156 are defined in the bore 154 of the depth stop cylindrical body 142. As also illustrated in FIG. 3, the cap 146 of the depth stop 140 has an inner diameter 158 generally corresponding to the maximum diameter of the bore of the cylindrical body, as defined by the recess(es) 156 therein, so that the cap 146 does not interfere with the routing of the chips through the depth stop 140.

By way of example, a tool shank 114 having a hex cross-sectional shape is illustrated herein although it is to be understood that any of a variety of shapes are known in the prior art and may be employed according to the invention to inhibit rotation of the tool relative to a tool holder or power source. Likewise, an annular groove such as annular groove 120 is optionally provided according to the invention for automatic coupling and release of the tool relative to the tool holder or power source.

Figures 6, 7:
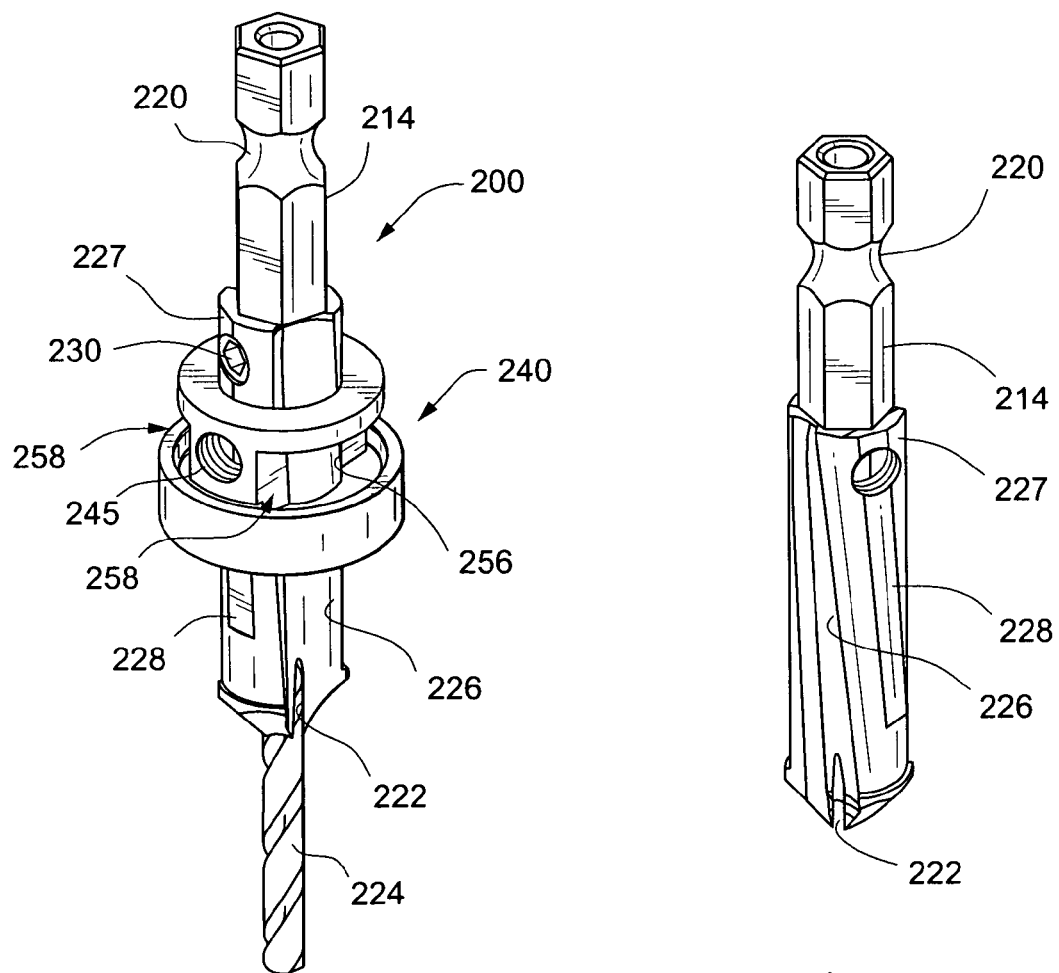
FIG. 6 is a perspective view of a countersink assembly provided according to another example embodiment of the invention.
FIG. 7 is a perspective view of the countersink body of FIG. 6, rotated 90 degrees.

FIG. 6 is a perspective view of another, presently preferred embodiment of the invention. The countersink assembly 200 is comprised of a countersink body 227 and a depth stop collar assembly 240. As in the first embodiment, a set screw 230 is disposed through a radial bore of the countersink body 227 for adjusting a length of the drill bit 224 extending from the countersink body 227. A second set screw (not shown) is provided for adjusting the position of the depth stop collar 240 along the length of the countersink. The adjustable depth stop collar 240 is movable along the length of the countersink body 227 so that it can be secured in place at substantially any point along its length.

The countersink body 227 comprises a tubular sleeve which includes a longitudinal bore 222 extending from a cutting edge to a proximal end and is adapted to axially receive a drill bit. One or more flutes 226 are formed on an outer wall of the tubular sleeve to extend from the cutting edge thereof proximally. Consequently, a radial slot is formed along a portion of the drill bit. The flutes of the FIG. 6-8 embodiment substantially correspond in shape to that described and illustrated in greater detail with respect to the first embodiment. In this example embodiment, the drill bit is an ordinary twist drill 224 bit commonly used in the art.

The depth stop collar assembly 240 provided in the illustrated example embodiment is a so-called no mar depth stop similar to that disclosed in prior U.S. Pat. No. 5,795,110 and similar to the depth stop described above with reference to the embodiment of FIGS. 1-5. Thus, the depth stop includes a cylindrical body 242 having a bore extending axially therethrough. The countersink of this embodiment may be made of the same material as described above with reference to the FIGS. 1-5 embodiment.

The depth stop fits over the tubular sleeve 227 of the countersink body. The cylindrical body 242 is preferably secured with respect to the countersink body by means of a set screw 244 or the like extending radially through a threaded aperture 245 formed in the cylindrical body. Although the depth stop is shown having only one set screw, it is contemplated that a depth stop according to the invention could include more than one set screw. In addition, the cylindrical body could be secured to the cutting tool by other means, such as, for example, a locking collet sleeve.

A cap 246 is fitted over one end of the cylindrical body. In the presently preferred example embodiment, the cap may generally correspond in configuration to the cap 146 described above with reference to the embodiment of FIGS. 1-5, or the described alternative configuration(s) thereof. Moreover, the cap 246 is likewise preferably composed of a polymer having a low coefficient of friction, preferably in the range of 0.04 to 0.10, such as nylon.

As in the above described embodiment, an annular ring is most preferably provided between the end face of the cylindrical body 242 and the cap 246. The annular ring is preferably a washer, also comprised of a polymer having a low coefficient of friction, for example in the range of 0.04 to 0.10, such as nylon, but may also comprise other friction reducing devices such as a needle thrust bearing. The annular ring facilitates rotation of the cap with respect to the body when the depth stop is pressed against a workpiece. Rotation is facilitated because the amount of friction between the annular ring and the cap is less than that between the annular ring and the body. The annular ring may bind when there is an axial force applied against the cap, but the cap will be less likely to bind under such an axial force. Best results are achieved if the flange has a non-interfering fit within the groove. Specifically, the groove and the flange should be sized and configured so that the flange does not contact the groove walls when the cap is under an axial thrust force from the workpiece. Thus, all axial bearing forces applied against the bottom surface of the cap will be received by the annular ring and end face of the body. If the flange bears against the sides of the groove, the cap might bind.

Figures 8, 9:
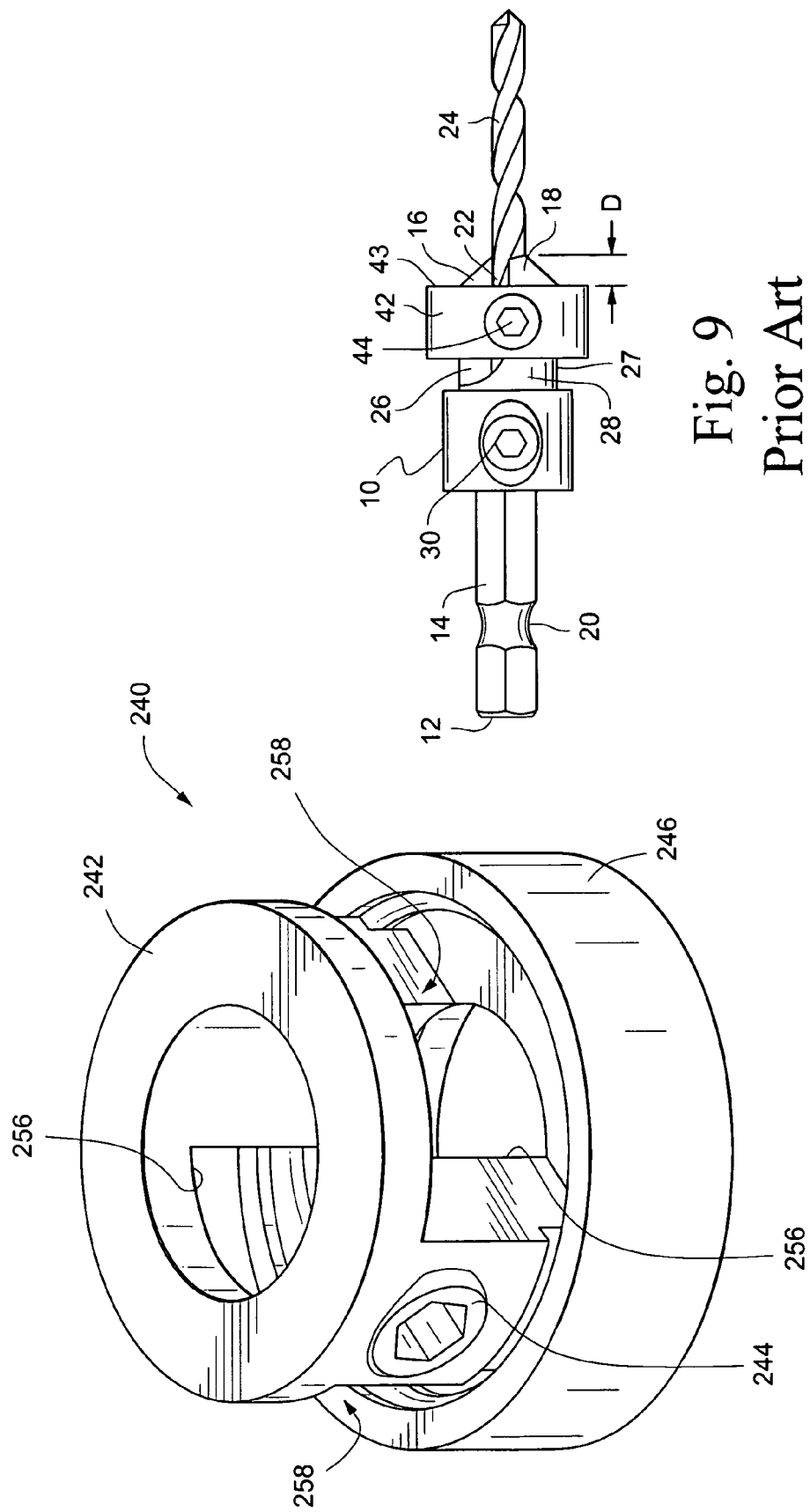
FIG. 8 is an enlarged perspective view of the no mar depth stop provided in the example embodiment of FIG. 6.
FIG. 9 is an elevational view of a conventional countersink having a depth stop.

In the embodiment illustrated in FIGS. 6 and 8, rather than providing a non-circular bore as in the embodiment of FIGS. 1-5, the stop collar is modified so as to provide for radial egress of chips from the side of the stop collar through openings 256 defined by lateral cutouts 258 in the collar 242. This performs comparably to the first embodiment which provided for complimentary flute cross-section and non-circular stop collar cross-section. Further, as illustrated in FIGS. 6 and 7, the countersink body includes flats 228 on diametrically opposite sides of the countersink body 227, only one of which is illustrated in FIGS. 6 and 7, to ensure that the radial egress ports 256 on the stop collar are clocked to the flutes 226 of the countersink body and to also maintain axial alignment of the stop collar by providing 3-point stop-collar-to-body contact.

In the embodiment of FIGS. 6 and 7, it is to be noted that the flutes 226 are formed to extend to the tool shank 214 so that the flutes extend along the full working length of the countersink body 227 and will be effective for chip egress irrespective of the position of the stop collar 240 along the countersink body 227 working length.

By way of example, a tool shank 214 having a hex cross-sectional shape is illustrated herein although it is to be understood that any of a variety of shapes are known in the prior art and may be employed according to the invention to inhibit rotation of the tool relative to a tool holder or power source. Likewise, an annular groove such as annular groove 220 is optionally provided according to the invention for automatic coupling and release of the tool relative to the tool holder or power source.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A countersink assembly comprising:
a countersink sleeve body with a distal cutting edge, a longitudinal bore through the countersink sleeve body to receive a drill bit, at least one flute extending from the distal cutting edge along at least a part of an outer surface thereof, and a mechanism for selectively securing the countersink sleeve body to a drill bit disposed in said longitudinal bore; and
a depth stop collar having a longitudinal bore to receive and be slidable along the countersink sleeve body, and a mechanism for selectively securing the depth stop collar to said countersink sleeve body disposed therein,
wherein at least one of the longitudinal bore of the depth stop collar and the flute is configured such as to allow chip egress at least one of 1) radially through the depth stop collar and/or 2) axially between the at least one flute and the depth stop collar toward a proximal end of the assembly, and
further including at least one longitudinally extending flat defined on an outer circumferential surface of said countersink sleeve body for engaging said mechanism for selectively securing the depth stop collar to said sleeve.

2. A countersink assembly as in claim 1, said depth stop collar includes at least one cutout for defining a radial opening that communicates the longitudinal bore thereof to a radial outside thereof so as to allow chip egress radially from the flute through a side of the depth stop collar.

3. A countersink assembly as in claim 2, wherein the longitudinal bore of the depth stop collar has a circular cross-section.

4. A countersink assembly as in claim 1, wherein said mechanism for selectively securing the depth stop collar to said sleeve comprises a set screw for engaging a said flat.

5. A countersink assembly as in claim 2, wherein the countersink body includes first and second diametrically opposite flutes, and said depth stop collar includes first and second diametrically opposite cutouts corresponding to the diametrically opposite flutes, so that the cutouts can be aligned with the flutes for chip passage.

6. A countersink assembly comprising:
a countersink sleeve body with a distal cutting edge, a longitudinal bore through the countersink sleeve body to receive a drill bit, at least one flute extending from the distal cutting edge along at least a part of an outer surface thereof, and a mechanism for selectively securing the countersink sleeve body to a drill bit disposed in said longitudinal bore; and
a depth stop collar having a longitudinal bore to receive and be slidable along the countersink sleeve body, and a mechanism for selectively securing the depth stop collar to said countersink sleeve body disposed therein, wherein at least one of the longitudinal bore of the depth stop collar and the flute is configured such as to allow chip egress at least one of 1) radially through the depth stop collar and/or 2) axially between the at least one flute and the depth stop collar toward a proximal end of the assembly, and wherein the longitudinal bore of the depth stop collar has a non-circular cross-section so as to include at least one radial recess extending radially outward from a remainder of the longitudinal bore, said recess defining an axial passage having a width generally corresponding to a width of said flute of the countersink sleeve body.

7. A countersink assembly as in claim 1, wherein the countersink sleeve body includes first and second diametrically opposite flutes and said bore of said stop collar includes first and second radial recesses corresponding to the diametrically opposite flutes so that the recesses can be aligned with the flutes for chip passage.

8. A countersink assembly as in claim 1, wherein the mechanism for selectively securing the countersink sleeve body to a drill bit comprises a radial threaded bore extending through the countersink sleeve body from the surface of the sleeve to the longitudinal bore and a set screw extending through the radial bore of the countersink sleeve body.

9. A countersink assembly as in claim 1, wherein said depth stop collar comprises a cylindrical sleeve body having an annular end face and an aperture defined axially therethrough defining said longitudinal bore for selectively receiving the countersink sleeve body, and a cap mounted to said cylindrical sleeve body so as to cover at least a portion of said end face and so as to be rotatable with respect to said cylindrical sleeve body about an axis of rotation of the countersink sleeve body, said cap being formed from a polymer having a lower coefficient of friction than a material of said cylindrical sleeve body.

10. A countersink assembly as in claim 9, wherein the cap is formed from a polymer having a coefficient friction in the range of 0.04 to 0.10.

11. A countersink assembly as in claim 9, wherein said depth stop collar further comprises an annular ring disposed between the cap and the end face of said cylindrical sleeve body.

12. A countersink assembly as in claim 9, wherein one of said cap and said cylindrical sleeve body has a circumferential groove formed on a periphery thereof and the other of said cap and said cylindrical sleeve body has a flange seated in said groove to rotatably mount the cap to the cylindrical sleeve body.

13. A countersink assembly as in claim 12, wherein the flange is continuous.

14. A countersink assembly as in claim 1, wherein each flute includes a flat surface and a part cylindrical surface extending from the distal cutting edge along the length of the flute at an angle to the longitudinal bore of the countersink sleeve body so as to present a slight down-cut spiral.

15. A countersink assembly as in claim 14, wherein each flute extends a fully working length of said countersink body from a cutting tip end thereof to a proximal structure for attaching to a power drill.

16. A countersink assembly comprising:
a countersink sleeve body with a distal cutting edge, a longitudinal bore through the countersink sleeve body to receive a drill bit, at least one flute extending from the distal cutting edge along at least a part of an outer surface thereof, and a mechanism for selectively securing the countersink sleeve body to a drill bit disposed in said longitudinal bore; and
a depth stop collar having a longitudinal bore to receive and be slidable along the countersink sleeve body, and a mechanism for selectively securing the depth stop collar to said countersink sleeve body disposed therein,
wherein at least one of the longitudinal bore of the depth stop collar and the flute is configured such as to allow chip egress at least one of 1) radially through the depth stop collar and/or 2) axially between the at least one flute and the depth stop collar toward a proximal end of the assembly, and
wherein each flute extends sufficiently beyond an operational range of the depth stop collar so as to allow chip egress therethrough past the depth stop collar.

17. A depth stop collar comprising:
a cylindrical sleeve body having an annular end face and an aperture defined axially therethrough defining a longitudinal bore adapted to receive a countersink sleeve body, and
a cap mounted to said cylindrical sleeve body so as to cover at least a portion of said end face and so as to be rotatable with respect to said cylindrical sleeve body about an axis of rotation of the countersink sleeve body, said cap being formed from a polymer having a lower coefficient of friction than a material of said cylindrical sleeve body,
said depth stop collar including at least one cutout for defining a radial opening that communicates the longitudinal bore thereof to a radial outside thereof so as to allow chip egress radially through a side of the depth stop collar.

18. A depth stop collar as in claim 17, wherein the longitudinal bore of the depth stop collar has a substantially circular cross-section.

19. A depth stop collar as in claim 17, further comprising an annular ring disposed between the cap and the end face of said cylindrical sleeve body.

20. A depth stop collar as in claim 17, wherein one of said cap and said cylindrical sleeve body has a circumferential groove formed on a periphery thereof and the other of said cap and said cylindrical sleeve body has a flange seated in said groove to rotatably mount the cap to the cylindrical sleeve body.

* * * * *